United States Patent
Gaffney et al.

(10) Patent No.: US 10,864,988 B2
(45) Date of Patent: Dec. 15, 2020

(54) AIRCRAFT HAVING SPLIT WING AND MONOPLANE CONFIGURATIONS

(71) Applicant: Textron Innovations Inc., Providence, RI (US)

(72) Inventors: Sean Robert Gaffney, Copley, OH (US); Robert Rex Graham, Jr., Agua Dulce, CA (US)

(73) Assignee: Textron Innovations Inc., Providence, RI (US)

(*) Notice: Subject to any disclaimer, the term of this patent is extended or adjusted under 35 U.S.C. 154(b) by 316 days.

(21) Appl. No.: 15/957,148

(22) Filed: Apr. 19, 2018

(65) Prior Publication Data
US 2019/0322366 A1  Oct. 24, 2019

(51) Int. Cl.
| | |
|---|---|
| *B64C 29/02* | (2006.01) |
| *B64C 3/32* | (2006.01) |
| *B64D 35/04* | (2006.01) |
| *B64D 27/24* | (2006.01) |
| *B64C 11/30* | (2006.01) |

(Continued)

(52) U.S. Cl.
CPC .......... *B64C 29/02* (2013.01); *B64C 3/16* (2013.01); *B64C 3/32* (2013.01); *B64C 3/546* (2013.01); *B64C 11/30* (2013.01); *B64C 37/02* (2013.01); *B64C 39/024* (2013.01); *B64D 27/24* (2013.01); *B64D 35/04* (2013.01); *B64C 2201/042* (2013.01); *B64C 2201/044* (2013.01); *B64C 2201/102* (2013.01); *B64C 2201/108* (2013.01); *B64C 2201/141* (2013.01);

(Continued)

(58) Field of Classification Search
CPC ... B64C 29/02; B64C 3/546; B64C 2201/102; B64C 2201/18; B64C 37/02; B64C 3/38; B64C 3/42; B64C 3/56; G05D 1/104
See application file for complete search history.

(56) References Cited

U.S. PATENT DOCUMENTS 2,496,087 A * 1/1950 Fleming ................. B64C 37/02
244/2
2,969,933 A * 1/1961 Vogt ....................... B64C 39/04
244/2

(Continued)

OTHER PUBLICATIONS https://starwarscardtrader.fandom.com/wiki/X-wing_Starfighter_-_Blueprints?file=Blueprints-16-X-wingStarfighter-Blue-Front.png (Year: 2015).*

(Continued)

*Primary Examiner* — Christopher D Hutchens
(74) *Attorney, Agent, or Firm* — Lawrence Youst PLLC

(57) ABSTRACT

An aircraft includes a fuselage coupled to a wing having a root section and first and second outboard sections each having first and second wing layers pivotably coupled to respective outboard ends of the root section. A thrust array is coupled to the wing. A power system is operably associated with the thrust array to provide power to each of a plurality of propulsion assemblies. A flight control system is operably associated with the thrust array and the wing. The flight control system is operable to control the thrust output from the propulsion assemblies and the configuration of the wing. In a thrust-borne vertical lift mode, the wing has a split wing configuration such that the thrust array forms a two dimensional thrust array. In the wing-borne forward flight mode, the wing has a monoplane configuration such that the thrust array forms a one dimensional thrust array.

19 Claims, 12 Drawing Sheets

(51) Int. Cl.
*B64C 3/16* (2006.01)
*B64C 39/02* (2006.01)
*B64C 37/02* (2006.01)
*B64C 3/54* (2006.01)
*B64D 27/02* (2006.01)

(52) U.S. Cl.
CPC .. *B64C 2201/146* (2013.01); *B64C 2201/165* (2013.01); *B64D 2027/026* (2013.01)

(56) References Cited

U.S. PATENT DOCUMENTS

| | | | |
|---|---|---|---|
| D345,396 S * | 3/1994 | Delaney | D12/319 |
| 9,550,567 B1 | 1/2017 | Erdozain et al. | |
| 2005/0045765 A1 * | 3/2005 | Pitt | B64C 3/54 244/46 |
| 2009/0127376 A1 * | 5/2009 | Gomez | B64C 23/076 244/2 |
| 2012/0048990 A1 * | 3/2012 | Sommer | B64C 39/024 244/3 |
| 2015/0225071 A1 * | 8/2015 | Tighe | B64C 29/02 244/12.4 |
| 2016/0023753 A1 * | 1/2016 | Alber | B64C 39/024 244/6 |
| 2017/0283052 A1 * | 10/2017 | Moshe | B64C 27/22 |
| 2017/0297699 A1 * | 10/2017 | Alber | B64D 27/24 |
| 2017/0371352 A1 * | 12/2017 | Mari Mari | B64C 29/02 |

OTHER PUBLICATIONS

Anderson, C.E.; Wingtip Coupling at 15,000 Feet—Dangerous Experiments; Flight Journal, Dec. 2000.

* cited by examiner

AIRCRAFT HAVING SPLIT WING AND MONOPLANE CONFIGURATIONS

TECHNICAL FIELD OF THE DISCLOSURE

The present disclosure relates, in general, to aircraft operable to transition between thrust-borne vertical lift and wing-borne forward flight modes and, in particular, to aircraft having a split wing configuration for vertical takeoff, hover and vertical landing and a monoplane configuration for forward flight.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Fixed-wing aircraft, such as airplanes, are capable of flight using wings that generate lift responsive to the forward airspeed of the aircraft, which is generated by forward thrust from one or more jet engines or propellers. The wings generally have an airfoil cross section that generates the lift force to support the airplane in flight. Fixed-wing aircraft, however, typically require a runway for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust.

SUMMARY

In a first aspect, the present disclosure is directed to an aircraft having a thrust-borne vertical lift mode and a wing-borne forward flight mode. The aircraft includes a fuselage and a wing that is coupled to the fuselage. The wing has a root section with first and second outboard ends, a first outboard section having first and second wing layers pivotably coupled to the first outboard end of the root section and a second outboard section having first and second wing layers pivotably coupled to the second outboard end of the root section. A thrust array, including a plurality of propulsion assemblies, is coupled to the wing. A power system is operably associated with the thrust array and operable to provide power to each of the propulsion assemblies. A flight control system is operably associated with the thrust array and the wing. The flight control system is operable to control thrust output from each of the propulsion assemblies and operable to control wing configuration. In the thrust-borne vertical lift mode, the wing has a split wing configuration with the wing layers of the first and second outboard sections separated such that the thrust array forms a two dimensional thrust array. In the wing-borne forward flight mode, the wing has a monoplane configuration with the wing layers of the first and second outboard sections joined such that the thrust array forms a one dimensional thrust array.

In some embodiments, the thrust array may include at least four propulsion assemblies. For example, the thrust array may include a first propulsion assembly positioned mid span of the first wing layer of the first outboard section of the wing, a second propulsion assembly positioned mid span of the second wing layer of the first outboard section of the wing, a third propulsion assembly positioned mid span of the first wing layer of the second outboard section of the wing and a fourth propulsion assembly positioned mid span of the second wing layer of the second outboard section of the wing. In certain embodiments, in the split wing configuration, the two dimensional thrust array may be a symmetric thrust array. In other embodiments, in the split wing configuration, the two dimensional thrust array may be an asymmetric thrust array. In some embodiments, the propulsion assemblies may have variable pitch rotor blades operable to change thrust output responsive to changes in rotor blade pitch and changes in rotational speed. In other embodiments, the propulsion assemblies may have fixed pitch rotor blades operable to change thrust output responsive to changes in rotational speed.

In some embodiments, the power system may include at least one internal combustion engine and a drive system that couples the at least one internal combustion engine with the plurality of propulsion assemblies. In other embodiments, the power system may include at least one battery and a plurality of electric motors each of which may be operably associated with at least one of the propulsion assemblies. In further embodiments, the power system may be a hybrid power system that includes at least one internal combustion engine, at least one alternator driven by the at least one internal combustion engine and at least one battery charged by the at least one alternator. In certain embodiments, in the thrust-borne vertical lift mode, the flight control system may be operable to control pitch, roll and yaw responsive to differential thrust output from the propulsion assemblies of the thrust array. In some embodiments, in the wing-borne forward flight mode, the flight control system may be operable to control yaw responsive to differential thrust output from the propulsion assemblies of the thrust array. Additionally, in the wing-borne forward flight mode, the flight control system may be operable to control pitch and roll responsive to operation of aerosurfaces on the first and second outboard sections of the wing.

In certain embodiments, in the split wing configuration, minor angles between the first wing layers of the first and second outboard sections and the root section are less than minor angles between the second wing layers of the first and second outboard sections and the root section. In some embodiments, during transitions between the thrust-borne vertical lift mode and the wing-borne forward flight mode, the wing transitions between the split wing configuration and the monoplane configuration. In certain embodiments, prior to transitions from the wing-borne forward flight mode to the thrust-borne vertical lift mode, the wing transitions from the monoplane configuration to the split wing configuration. In some embodiments, the root section of the wing may be a dihedral root section. In certain embodiments, the flight control system may be a remote controlled flight control system, an autonomous flight control system or a combination thereof.

In a second aspect, the present disclosure is directed to a multi-aircraft system including at least first and second aircraft connectable wingtip-to-wingtip during flight. Each aircraft has a thrust-borne vertical lift mode and a wing-borne forward flight mode and each aircraft includes a fuselage and a wing that is coupled to the fuselage. The wing has a root section with first and second outboard ends, a first outboard section having first and second wing layers pivotably coupled to the first outboard end of the root section and a second outboard section having first and second wing layers pivotably coupled to the second outboard end of the root section. A thrust array, including a plurality of propulsion assemblies, is coupled to the wing. A power system is operably associated with the thrust array and operable to provide power to each of the propulsion assemblies. A female wingtip coupling assembly is disposed at the outboard end of the first outboard section. A male wingtip coupling assembly is disposed at the outboard end of the second outboard section. A flight control system is operably associated with the thrust array, the wing and the wingtip coupling assemblies. The flight control system is operable to control thrust output from each of the propulsion assemblies, wing configuration and wingtip coupling. In the thrust-borne vertical lift mode, the wing has a split wing configuration with the wing layers of the first and second outboard sections separated such that the thrust array forms a two dimensional thrust array. In the wing-borne forward flight mode, the wing has a monoplane configuration with the wing layers of the first and second outboard sections joined such that the thrust array forms a one dimensional thrust array. In a connected flight mode, the female wingtip coupling assembly of the first aircraft is coupled to the male wingtip coupling assembly of the second aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
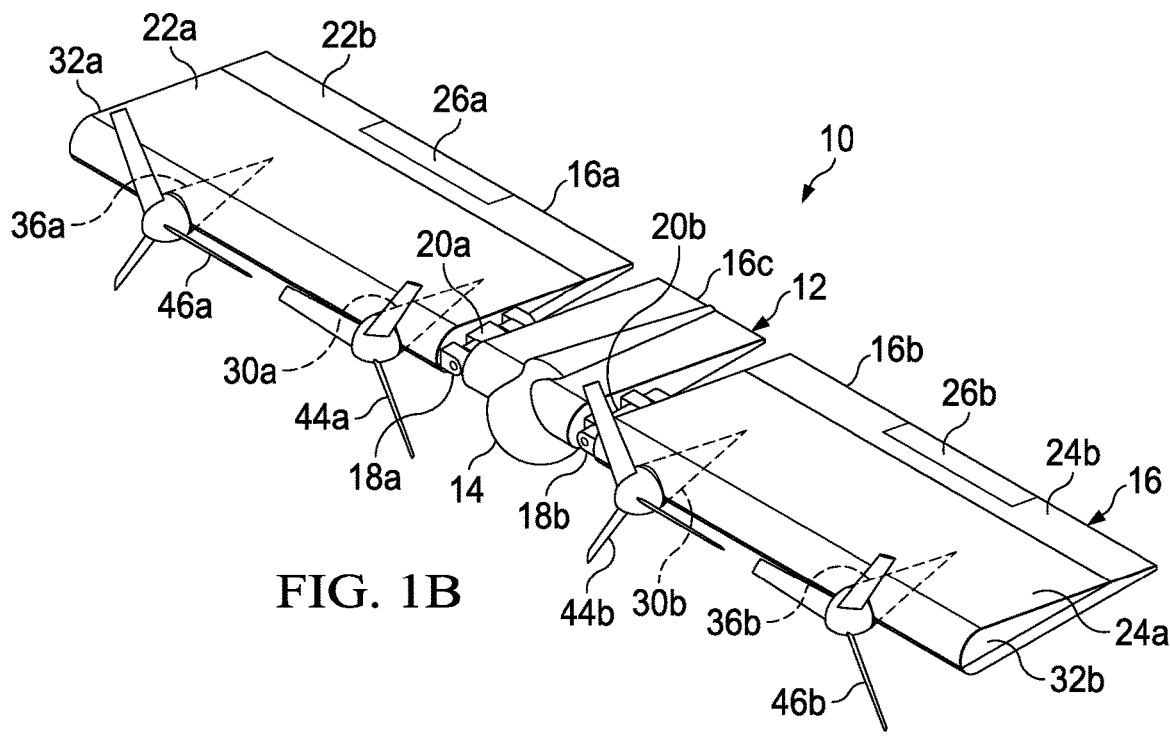
FIGS. 1A-1J are schematic illustrations of an aircraft having split wing and monoplane configurations in accordance with embodiments of the present disclosure.
Figure 1A:
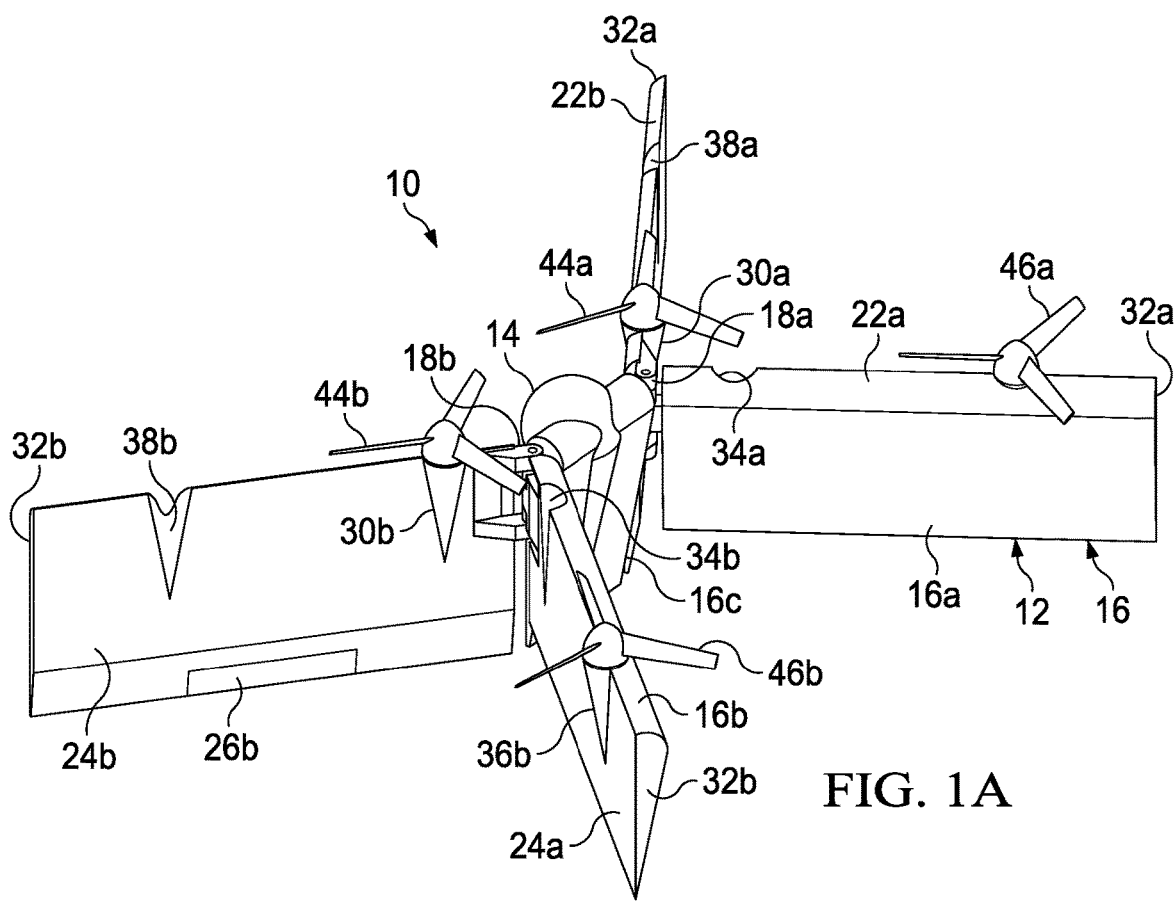
Figure 1D:
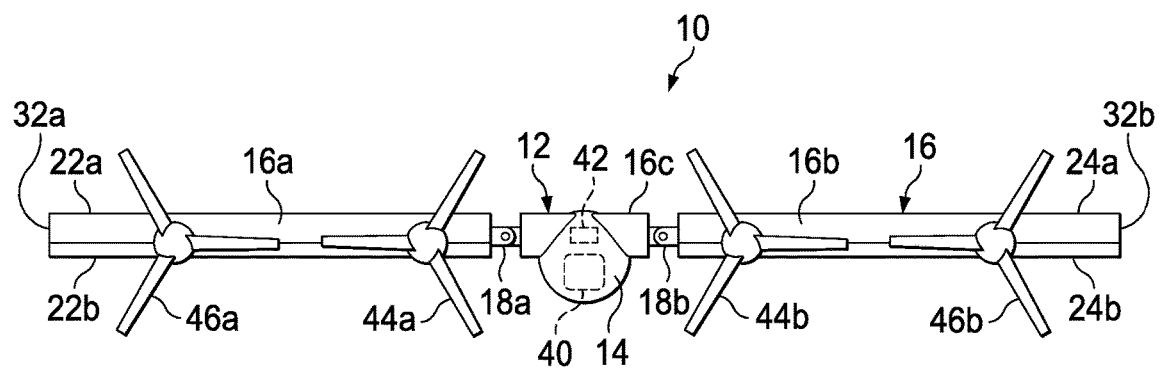
Figure 1C:
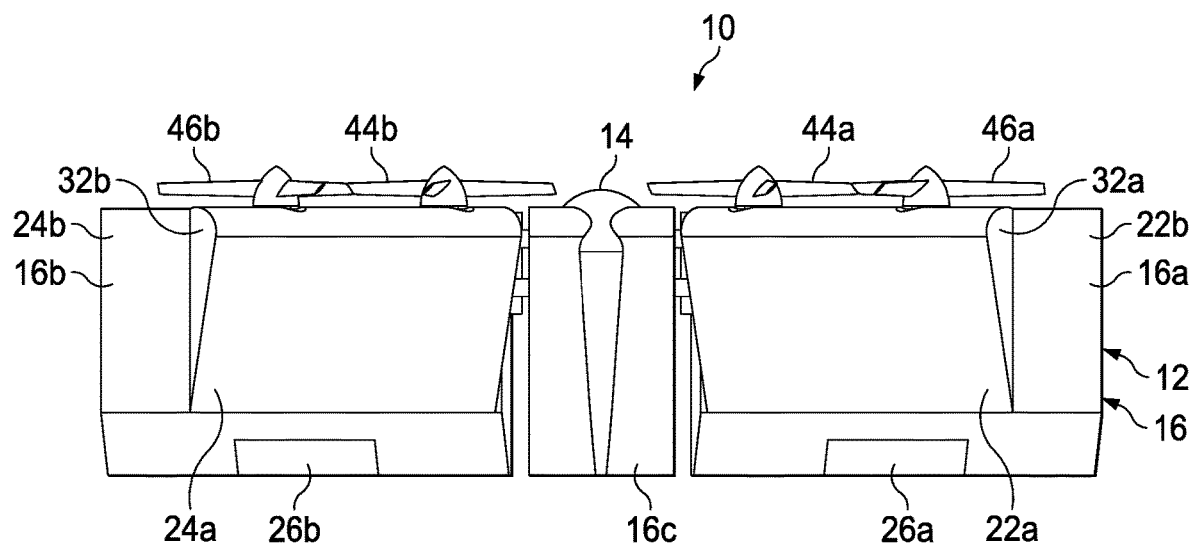
Figure 1F:
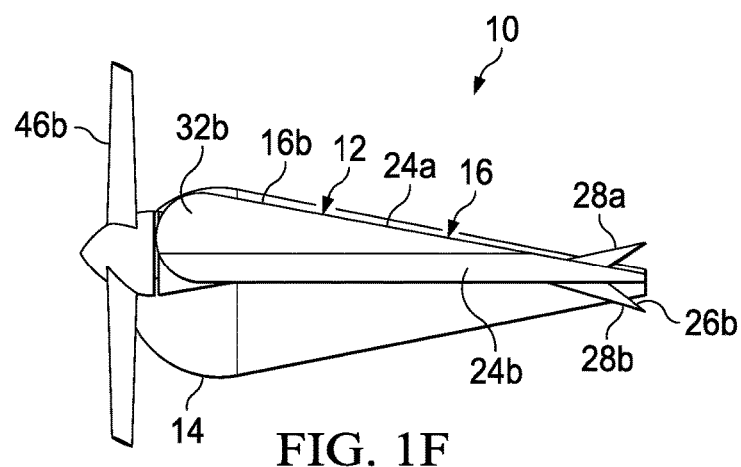
Figure 1E:
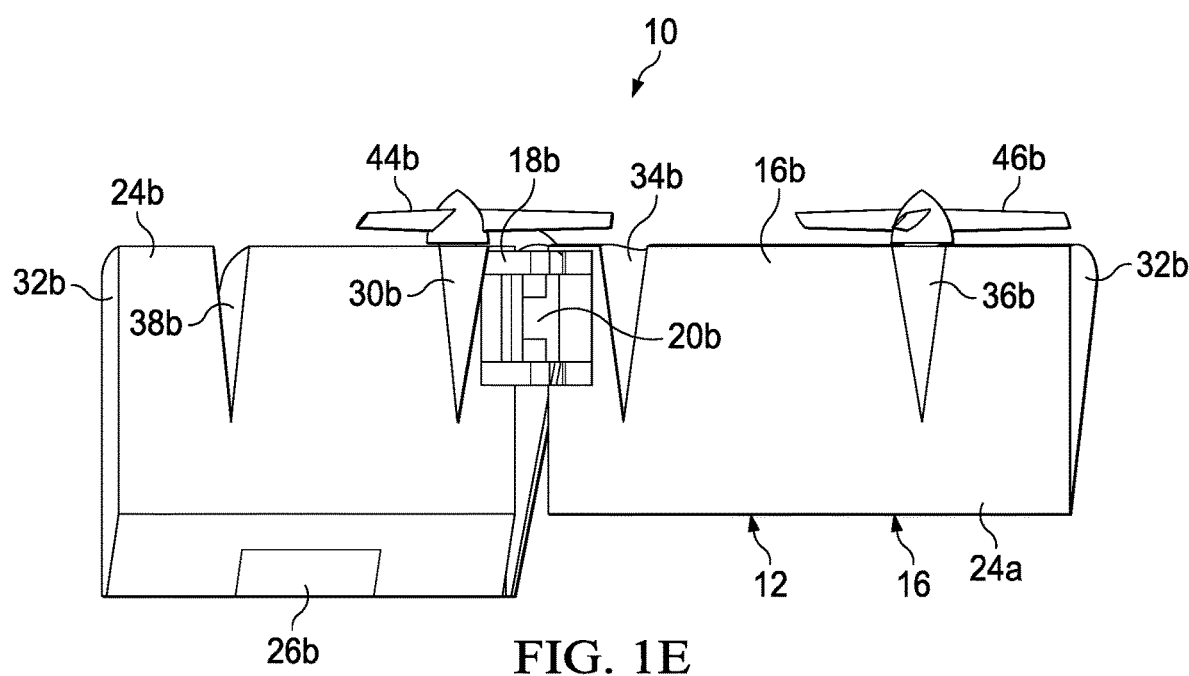

Referring to FIGS. 1A-1F in the drawings, various views of an aircraft 10 having a thrust-borne vertical lift mode in a split wing configuration and a wing-borne forward flight mode in a monoplane configuration are depicted. FIGS. 1A, 1C, 1E depict aircraft 10 in thrust-borne vertical lift mode for vertical takeoffs, hovering and vertical landing, which may also be referred to as VTOL flight mode. FIGS. 1B, 1D, 1F depict aircraft 10 in wing-borne forward flight mode which may also be referred to as high speed, high efficiency and/or high endurance forward flight mode. In the illustrated embodiment, aircraft 10 has an airframe 12 including a fuselage 14 and a wing 16. Fuselage 14 may be coupled to wing 16 by any suitable means including being integral with wing 16. The outer skin of fuselage 14 and wing 16 is preferably formed from high strength and lightweight material such as fiberglass, carbon, plastic, metal or other suitable material or combination of materials.

Wing 16 has an airfoil cross-section that is operable to generate lift responsive to the forward airspeed of aircraft 10. Wing 16 has two outboard sections 16a, 16b with a root section 16c positioned therebetween. In the illustrated embodiment, root section 16c supports fuselage 14. Outboard section 16a, which may be referred as the starboard outboard section, is coupled to an outboard end of root section 16c at a hinge assembly 18a having an actuator 20a operable to separate and join wing layer 22a and wing layer 22b of outboard section 16a. Outboard section 16b, which may be referred as the port outboard section, is coupled to an outboard end of root section 16c at a hinge assembly 18b having an actuator 20b operable to separate and join wing layer 24a and wing layer 24b of outboard section 16b. Wing layer 22b of outboard section 16a includes control surfaces depicted as aerosurfaces 26a and wing layer 24b of outboard section 16b includes control surfaces depicted as aerosurfaces 26b. Aerosurfaces 26a, 26b preferably each have a split flap design. As best seen in FIG. 1F, aerosurfaces 26b include an upper flap 28a and a lower flap 28b that are operable for independent movement relative to one another and relative to wing 16. In wing-borne forward flight mode, aerosurfaces 26a, 26b may operate as traditional flaps to increase the lift provided by wing 16 at a given airspeed and/or increase the drag force. Aerosurfaces 26a, 26b may also operate as elevators to control the pitch and/or angle of attack of wing 16. In addition, aerosurfaces 26a, 26b may operate as ailerons to control the roll or bank of aircraft 10. Further, aerosurfaces 26a, 26b may be used to enhance hover stability in thrust-borne vertical lift mode.

In the illustrated embodiment, airframe 12 includes an inboard nacelle 30a that is positioned mid span of wing layer 22b of outboard section 16a, at any suitable location between the hinge assembly 18a and wingtip 32a. Inboard nacelle 30a may be coupled to wing layer 22b by any suitable means including being integral with wing layer 22b. When aircraft 10 is in wing-borne forward flight mode, inboard nacelle 30a is received within nesting slot 34a of wing layer 22a. Likewise, airframe 12 includes an inboard nacelle 30b that is positioned mid span of wing layer 24b of outboard section 16b, at any suitable location between the hinge assembly 18b and wingtip 32b. Inboard nacelle 30b may be coupled to wing layer 24b by any suitable means including being integral with wing layer 24b. When aircraft 10 is in wing-borne forward flight mode, inboard nacelle 30b is received within nesting slot 34b of wing layer 24a.

In the illustrated embodiment, airframe 12 includes an outboard nacelle 36a that is positioned mid span of wing layer 22a of outboard section 16a, at any suitable location between the hinge assembly 18a and wingtip 32a outboard of inboard nacelle 30a. Outboard nacelle 36a may be coupled to wing layer 22a by any suitable means including being integral with wing layer 22a. When aircraft 10 is in wing-borne forward flight mode, outboard nacelle 36a is received within nesting slot 38a of wing layer 22b. Likewise, airframe 12 includes an outboard nacelle 36b that is positioned mid span of wing layer 24a of outboard section 16b, at any suitable location between the hinge assembly 18b and wingtip 32b outboard of inboard nacelle 30b. Outboard nacelle 36b may be coupled to wing layer 24a by any suitable means including being integral with wing layer 24a. When aircraft 10 is in wing-borne forward flight mode, outboard nacelle 36b is received within nesting slot 38b of wing layer 24b.

Fuselage 14, wing 16 and nacelles 30a, 30b, 36a, 36b preferably include one or more internal regions and/or passageways operable to contain mechanical equipment, flight control systems, energy sources, communication lines, electrical lines and other desired systems. For example, in the illustrated embodiment, fuselage 14 contains a power system 40 for aircraft 10, as best seen in FIG. 1D. As discussed herein, power system 40 may include one or more internal combustion engines that are preferably used in mechanically driven embodiments of aircraft 10. Alternatively, power system 40 may include one or more electrical power sources such as batteries that are preferably used in electrically driven embodiments of aircraft 10. As another alternatively, power system 40 may be a hybrid power system including one or more internal combustion engines that drive alternators to charge one or more batteries that are used in electrically driven embodiments of aircraft 10.

In addition, as best seen in FIG. 1D, fuselage 14 houses the flight control system 42 of aircraft 10 such as a redundant digital flight control system or a triply redundant digital flight control system. Flight control system 42 preferably includes non-transitory computer readable storage media including a set of computer instructions executable by one or more processors for controlling the operation of aircraft 10. Flight control system 42 may be implemented on one or more general-purpose computers, special purpose computers or other machines with memory and processing capability. For example, flight control system 42 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 42 may be a microprocessor-based system operable to execute program code in the form of machine-executable instructions. In addition, flight control system 42 may be selectively connectable to other computer systems via a proprietary encrypted network, a public encrypted network, the Internet or other suitable communication network that may include both wired and wireless connections.

In the illustrated embodiment, aircraft 10 has a distributed thrust array that includes four propulsion assemblies that are independently operated and controlled by flight control system 42. More specifically, inboard propulsion assembly 44a extends from inboard nacelle 30a, inboard propulsion assembly 44b extends from inboard nacelle 30b, outboard propulsion assembly 46a extends from outboard nacelle 36a and outboard propulsion assembly 46b extends from outboard nacelle 36b. In the illustrated embodiment, the four independently operating propulsion assemblies 44a, 44b, 46a, 46b form a two-dimensional thrust array in the thrust-borne vertical lift mode of aircraft 10, as best seen in FIG. 1A, wherein propulsion assemblies 44a, 44b, 46a, 46b rotate in a common horizontal plane but do not occupy a common vertical plane. Also, in the illustrated embodiment, the four independently operating propulsion assemblies 44a, 44b, 46a, 46b form a one-dimensional thrust array in the wing-borne forward flight mode of aircraft 10, as best seen in FIG. 1D, wherein propulsion assemblies 44a, 44b, 46a, 46b rotate in a common vertical plane and also share a common horizontal plane. Flight control system 42 is operable to communicate with each propulsion assembly 44a, 44b, 46a, 46b such that each propulsion assembly 44a, 44b, 46a, 46b may be individually and independently controlled and operated. For example, flight control system 42 is operable to individually and independently control the operating speed and/or blade pitch of each propulsion assembly 44a, 44b, 46a, 46b.

Even though the distributed thrust array of the present disclosure has been depicted and described as having a particular number of propulsion assemblies, it should be understood by those having ordinary skill in the art that the distributed thrust array of the present disclosure could have any number of propulsion assemblies including six, eight or other number of independent propulsion assemblies. In addition, even though the propulsion assemblies of the present disclosure have been depicted and described as being mid wing propulsion assemblies, it should be understood by those having ordinary skill in the art that the propulsion assemblies of the present disclosure could have other configurations including high wing configurations, low wing configurations or other suitable configurations. Also, even though the propulsion assemblies of the present disclosure have been depicted and described as having three rotor blades, it should be understood by those having ordinary skill in the art that the propulsion assemblies of the present disclosure could have other numbers of rotor blades both less than and greater than three.

Referring specifically to FIGS. 1A, 1C and 1E, aircraft 10 is in the thrust-borne vertical lift mode and in the split wing configuration. As discussed herein, each propulsion assembly 44a, 44b, 46a, 46b is independently controllable such that operational changes of certain propulsion assemblies 44a, 44b, 46a, 46b within the two-dimensional distributed thrust array enable pitch, yaw and roll control of aircraft 10 during such VTOL operations. For example, by using differential thrust output of propulsion assemblies 46a, 46b relative to propulsion assemblies 44a, 44b, pitch control is achieved. As another example, by using differential thrust output of propulsion assemblies 46a, 44a relative to propulsion assemblies 46b, 44b, roll control is achieved. Changing the thrust output of individual propulsion assemblies 44a, 44b, 46a, 46b may be accomplished by changing the rotational speed of particular propulsion assemblies 44a, 44b, 46a, 46b in embodiments wherein propulsion assemblies 44a, 44b, 46a, 46b have fixed pitch or variable pitch rotors. Additionally, changing the thrust output of individual propulsion assemblies 44a, 44b, 46a, 46b may be accomplished by changing the blade pitch of particular propulsion assemblies 44a, 44b, 46a, 46b in embodiments of propulsion assemblies 44a, 44b, 46a, 46b that incorporate variable pitch rotors and collective pitch control.

Torque balance of aircraft 10 during VTOL operations may be achieved by counter rotating propulsion assemblies 44a, 44b and counter rotating propulsion assemblies 46a, 46b. Alternatively or additionally, torque balance of aircraft 10 during VTOL operations may be achieved by counter rotating propulsion assemblies 44a, 46a and counter rotating propulsion assemblies 44b, 46b. Yaw control and/or correction of torque imbalances of aircraft 10 may be achieved by utilizing differential thrust output of clockwise rotating propulsion assemblies 46a, 44b compared to counter clockwise rotating propulsion assemblies 46b, 44a. In a similar manner, yaw control of aircraft 10 may be achieved by utilizing differential thrust output of port propulsion assemblies 44b, 46b compared to starboard propulsion assemblies 44a, 46a in the wing-borne forward flight mode of aircraft 10, as best seen in FIGS. 1B, 1D, 1F.

Figure 1G:
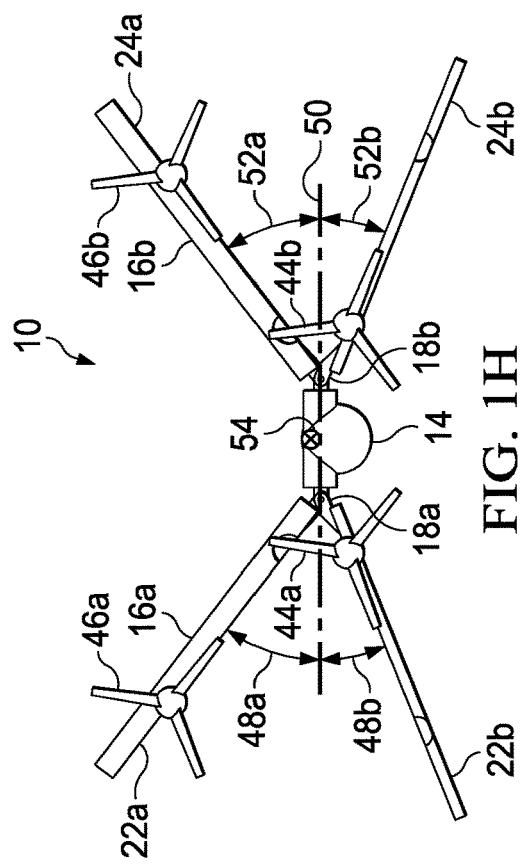

The split wing configuration of aircraft 10, the monoplane configuration of aircraft 10 and transitions therebetween will now be described with reference to FIGS. 1G-1J. In thrust-borne vertical lift mode, aircraft 10 is preferably arranged in the split wing configuration, as best seen in FIG. 1G. In the split wing configuration, wing layers 22a, 22b of outboard section 16a of wing 16 are separated such that the minor angle 48a between wing layer 22a and pitch axis 50 forms an acute angle and the minor angle 48b between wing layer 22b and pitch axis 50 forms an acute angle. In the illustrated embodiment, minor angle 48a is about 50 degrees and minor angle 48b is about 35 degrees. Likewise, wing layers 24a, 24b of outboard section 16b of wing 16 are separated such that the minor angle 52a between wing layer 24a and pitch axis 50 forms an acute angle and the minor angle 52b between wing layer 24b and pitch axis 50 forms an acute angle. In the illustrated embodiment, minor angle 52a is about 50 degrees and minor angle 52b is about 35 degrees. In the split wing configuration, the center of gravity 54 of aircraft 10 is substantially centered between propulsion assemblies 44a, 44b, 46a, 46b which aids in stability of aircraft 10 during VTOL operations.

Figure 1H:
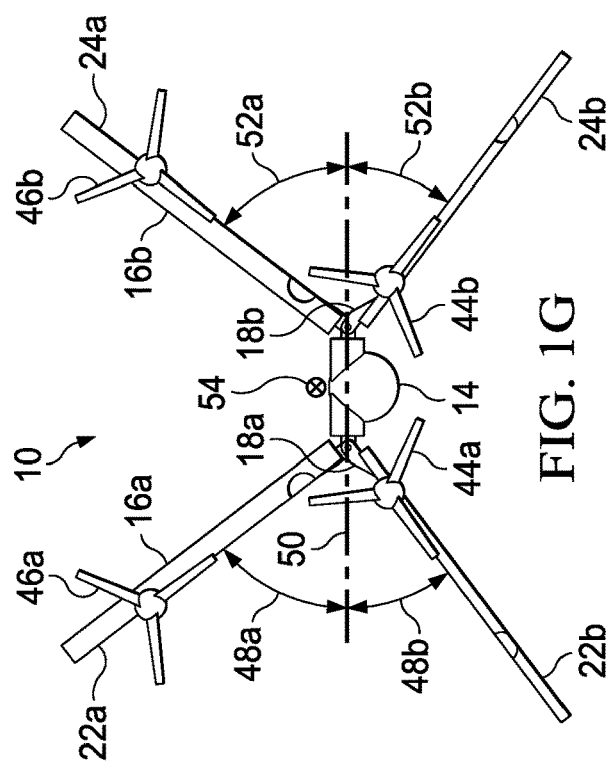
Figure 1I:
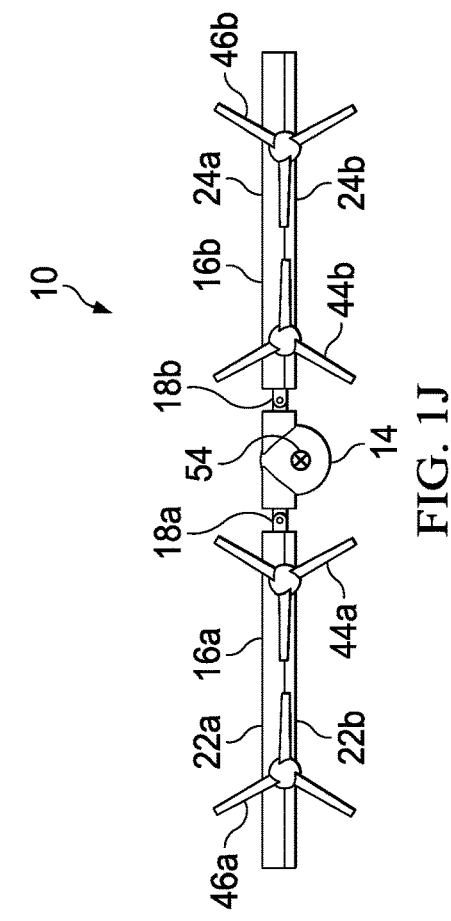
Figure 1J:
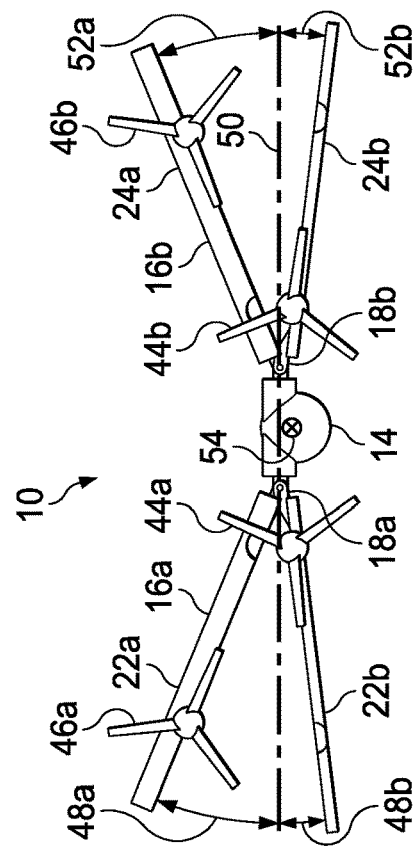

In wing-borne forward flight mode, aircraft 10 is preferably arranged in the monoplane configuration, as best seen in FIG. 1J. In the monoplane configuration, wing layers 22a, 22b of outboard section 16a of wing 16 are joined to form a single wing element. Likewise, wing layers 24a, 24b of outboard section 16b of wing 16 are joined to form a single wing element. In the monoplane configuration, the center of gravity 54 of aircraft 10 is located below wing 16, which aids in stability of aircraft 10 during forward flight operations.

As discussed herein, aircraft 10 preferably transitions between the split wing configuration and the monoplane configuration as aircraft 10 transitions between thrust-borne vertical lift mode and wing-borne forward flight mode. The transition from the split wing configuration to the monoplane configuration is represented sequentially in FIGS. 1G-1J. As illustrated, wing layers 22a, 22b of outboard section 16a are operable to pivot from the separated position to the joined position about hinge assembly 18a. Likewise, wing layers 24a, 24b of outboard section 16b are operable to pivot from the separated position to the joined position about hinge assembly 18b. Preferably, wing layers 22a, 22b of outboard section 16a and wing layers 24a, 24b of outboard section 16b are pivoted simultaneously which aids in stability of aircraft 10 during transitions from thrust-borne vertical lift mode to wing-borne forward flight mode. For example, FIG. 1H illustrates aircraft 10 in one state during the transition from the split wing configuration to the monoplane configuration wherein minor angles 48a, 52a are congruent angles and are about 35 degrees and minor angles 48b, 52b are congruent angles and are about 20 degrees. As another example, FIG. 1I illustrates aircraft 10 in another state during the transition from the split wing configuration to the monoplane configuration wherein minor angles 48a, 52a are congruent angles and are about 20 degrees and minor angles 48b, 52b are congruent angles and are about 7 degrees.

The transition from the monoplane configuration to the split wing configuration is represented sequentially in FIGS. 1J-1G. As illustrated, wing layers 22a, 22b of outboard section 16a are operable to pivot from the joined position to the separated position about hinge assembly 18a. Likewise, wing layers 24a, 24b of outboard section 16b are operable to pivot from the joined position to the separated position about hinge assembly 18b. Preferably, wing layers 22a, 22b of outboard section 16a and wing layers 24a, 24b of outboard section 16b are pivoted simultaneously which aids in stability of aircraft 10 during transitions from wing-borne forward flight mode to thrust-borne vertical lift mode. For example, FIG. 1I illustrates aircraft 10 in one state during the transition from the monoplane configuration to the split wing configuration wherein minor angles 48a, 52a are congruent angles and are about 20 degrees and minor angles 48b, 52b are congruent angles and are about 7 degrees. As another example, FIG. 1H illustrates aircraft 10 in another state during the transition from the monoplane configuration to the split wing configuration wherein minor angles 48a, 52a are congruent angles and are about 35 degrees and minor angles 48b, 52b are congruent angles and are about 20 degrees.

Figure 2:
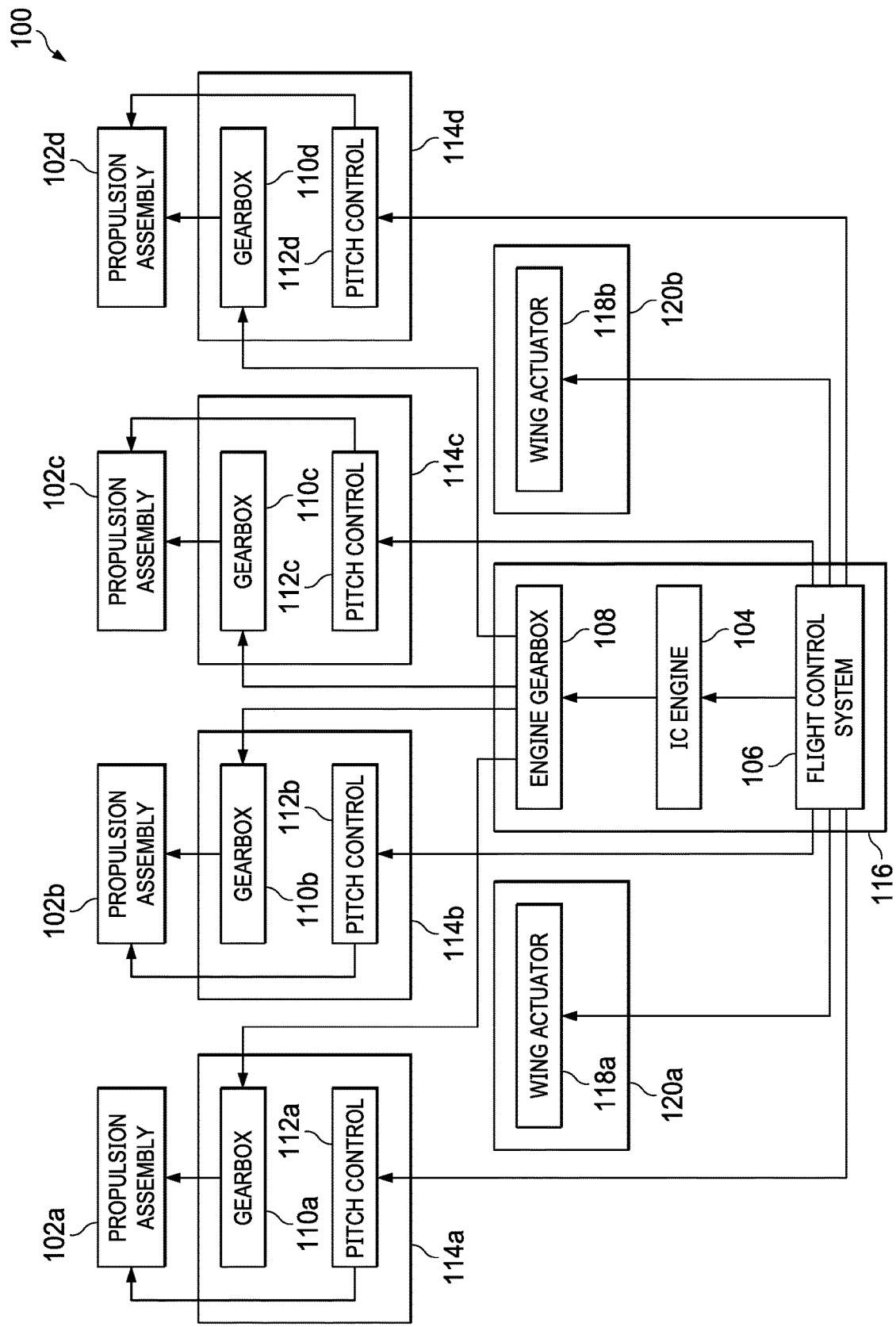
FIG. 2 is a block diagram of propulsion and control systems for an aircraft having split wing and monoplane configurations in accordance with embodiments of the present disclosure.

Referring additionally to FIG. 2, a block diagram depicts power, thrust and control systems of an aircraft 100 having split wing and monoplane configurations. Aircraft 100 includes propulsion assemblies 102a, 102b, 102c, 102d, a power system depicted as an internal combustion engine 104, such as a turboshaft engine operable to burn a liquid fluid, and a flight control system 106. Engine 104 is coupled to each of propulsion assemblies 102a, 102b, 102c, 102d by a drive system depicted as engine gearbox 108, outboard gearbox 110a, inboard gearbox 110b, inboard gearbox 110c and outboard gearbox 110d. In an embodiment of the drive system, each of engine gearbox 108, outboard gearboxes 110a, 110d and inboard gearboxes 110b, 110c may include a beveled gear set operable to change the direction of torque by ninety degrees. The beveled gear sets may include straight bevel gears, spiral bevel gears or other suitable gear arrangements. One or more shafts provide the torque path between engine gearbox 108 and each of outboard gearboxes 110a, 110d and inboard gearboxes 110b, 110c, respectively. In addition, engine gearbox 108 and/or outboard gearboxes 110a, 110d and inboard gearboxes 110b, 110c may include additional gear systems such as gear-reducing transmissions designed to enable optimum engine speed and optimal rotor speed during flight operations.

Internal combustion engine 104 preferably operates at a constant speed during flight operations. In order to individually control the thrust output from each of propulsion assemblies 102a, 102b, 102c, 102d, flight control system 106 sends commands to pitch control assemblies 112a, 112b, 112c, 112d to adjust the pitch of the associated rotor blades. In an embodiment, pitch control assemblies 112a, 112b, 112c, 112d may include rise and fall swash plates operable for collective pitch control and/or cyclic pitch control. In the illustrated embodiment, outboard gearbox 110a and pitch control assembly 112a are housed within outboard nacelle 114a; inboard gearbox 110b and pitch control assembly 112b are housed within inboard nacelle 114b; inboard gearbox 110c and pitch control assembly 112c are housed within inboard nacelle 114c; and outboard gearbox 110d and pitch control assembly 112d are housed within outboard nacelle 114d. Also, in the illustrated embodiment, engine 104, flight control system 106 and engine gearbox 108 are housed within fuselage 116.

In order to transition aircraft 100 between the split wing configuration and the monoplane configuration, aircraft 100 includes port wing actuator 118a and starboard wing actuator 118b. Wing actuator 118a is a component of hinge assembly 120a and wing actuator 118b is a component of hinge assembly 120b. In the illustrated embodiment, wing actuators 118a, 118b are electrically driven actuators that include a suitable motor and gear systems to transition the wing layers between the joined and separated positions. Electrical power may be provided by one or more batteries (not pictured) that may be charged from the output of an alternator (not pictured) coupled to engine 104 or other suitable electric source. Wing actuators 118a, 118b are preferably self-locking in both in the split wing configuration and the monoplane configuration of aircraft 100. In other embodiments, wing actuators 118a, 118b may be hydraulic linear actuators that use hydraulic force to transition the wing layers between the joined and separated positions and to lock the wing layers in the desired position. In further embodiments, wing actuators 118a, 118b may be mechanical linear actuators and may include mechanical locks to maintain the wing layers in the desired position.

Figure 3:
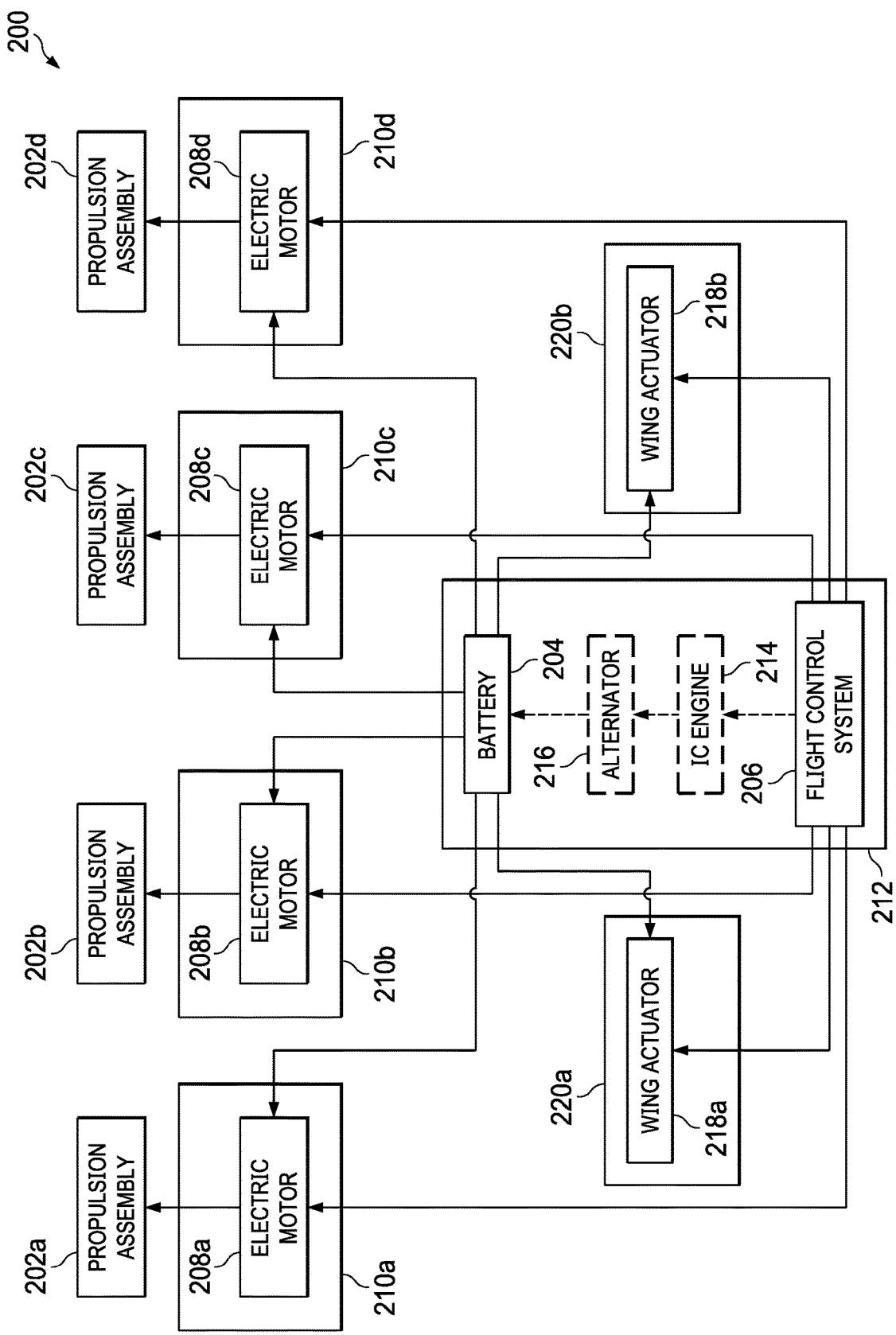
FIG. 3 is a block diagram of propulsion and control systems for an aircraft having split wing and monoplane configurations in accordance with embodiments of the present disclosure.

Referring now to FIG. 3, a block diagram depicts power, thrust and control systems of an aircraft 200 having split wing and monoplane configurations. Aircraft 200 includes propulsion assemblies 202a, 202b, 202c, 202d, a power system depicted as one or more batteries 204 and a flight control system 206. In the illustrated embodiment, each propulsion assembly 202a, 202b, 202c, 202d is driven by a respective electric motor 208a, 208b, 208c, 208d that receives power from battery 204. In order to individually control the thrust output from each of propulsion assemblies 202a, 202b, 202c, 202d, flight control system 206 sends commands to electric motors 208a, 208b, 208c, 208d to adjust the rotational speed of the associated propulsion assembly 202a, 202b, 202c, 202d. In the illustrated embodiment, electric motor 208a is housed within outboard nacelle 210a; electric motor 208b is housed within inboard nacelle 210b; electric motor 208c is housed within inboard nacelle 210c; and electric motor 208d is housed within outboard nacelle 210d. Also, in the illustrated embodiment, battery 204 and flight control system 206 are housed within fuselage 212. Optionally, the power system of aircraft 200 could be a hybrid power system in which an internal combustion engine 214 drives an alternator 216 to charge battery 204 during flight. Even though aircraft 200 has been depicted and described as having a one to one relationship of electric motors to propulsion assemblies, it should be understood by those having ordinary skill in the art that an aircraft of the present disclosure could have a single electric motor driving more than one propulsion assembly or could have more than one electric motor driving a single propulsion assembly.

In order to transition aircraft 200 between the split wing and monoplane configurations, aircraft 200 includes port wing actuator 218a and starboard wing actuator 218b. Wing actuator 218a is a component of hinge assembly 220a and wing actuator 218b is a component of hinge assembly 220b. In an embodiment, wing actuators 218a, 218b are electrically driven actuators that include a suitable motor and gear systems to transition the wing layers between the joined and separated positions. Electrical power is provided by battery 204. Wing actuators 218a, 218b are preferably self-locking in both in the split wing configuration and the monoplane configuration of aircraft 200.

Figure 4A:
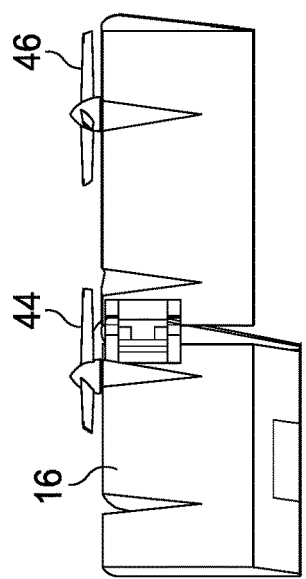
FIGS. 4A-4J are schematic illustrations of an aircraft having split wing and monoplane configurations in a sequential flight operating scenario in accordance with embodiments of the present disclosure.

Referring next to FIGS. 4A-4J in the drawings, a sequential flight-operating scenario of aircraft 10 is depicted. It is noted that reference to the port and starboard components of aircraft 10 will be made collectively in FIGS. 4A-4J. For example, a reference to propulsion assemblies 46 in FIGS. 4A-4J is equivalent to the reference to propulsion assemblies 46a, 46b in FIGS. 1A-1J. As best seen in FIG. 4A, aircraft 10 is positioned on a launch surface at a current location. Aircraft 10 is in the split wing configuration with the rotor blades of propulsion assemblies 44, 46 positioned to rotate in a substantially horizontal plane. Aircraft 10 may be operated responsive to autonomous flight control, remote flight control or a combination thereof. For example, it may be desirable to utilize remote flight control during certain maneuvers such as takeoff and landing but rely on autonomous flight control during hover, forward flight and/or transitions between forward flight and VTOL operations.

Figure 4B:
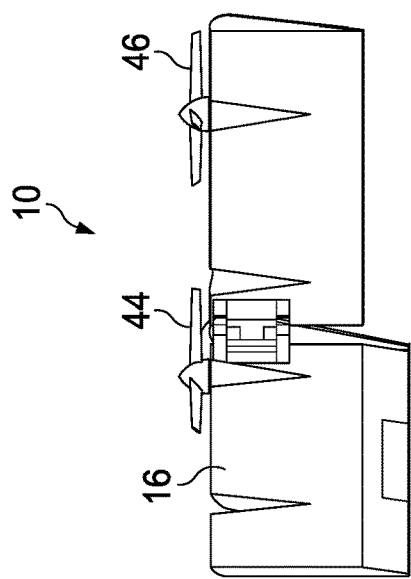
Figure 4C:
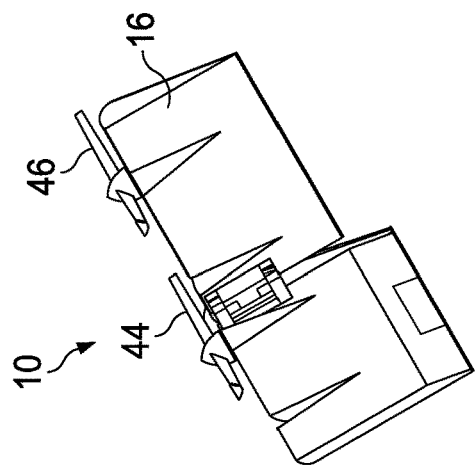
Figure 4D:
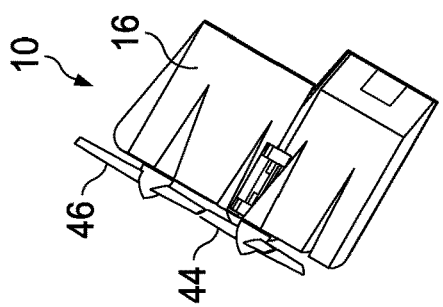
Figure 4E:
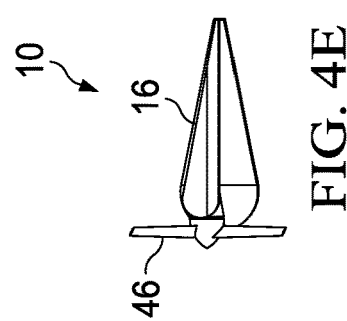

Regardless of the chosen flight control mode, each of propulsion assemblies 44, 46 may be independently controllable during VTOL flight operations to provide pitch, roll and yaw control through differential thrust output from propulsion assemblies 44, 46, as described herein. After takeoff, aircraft 10 may begin the transition from thrust-borne vertical lift mode to wing-borne forward flight mode, as best seen in the progression of FIGS. 4B-4E. In the illustrated embodiment, the transition begins with aircraft 10 traveling generally vertically to a desired altitude and to a desired speed, as best seen in FIG. 4B. Aircraft 10 may then begin to pitch forward by, for example, engaging in differential thrust output of propulsion assemblies 44 relative to propulsion assemblies 46. At the same time, the wing layers of wing 16 may begin to transition from the separated positions to the joined positions, as best seen in FIGS. 4C and 1H. The process of pitching forward and joining the wing layers continues, as best seen in FIGS. 4D and 1I. The transition is complete when the wing layers are fully joined and aircraft 10 has pitched forward to a horizontal attitude, as best seen in FIGS. 4E and 1J. In other embodiments, the processes of pitching aircraft 10 forward and joining the wing layers may occur independent of each other with the forward pitching taking place before the joining the wing layers or the joining the wing layers taking place before the forward pitching. It should be noted that aircraft 10 is fully capable for forward flight in the split wing configuration.

Figure 5C:
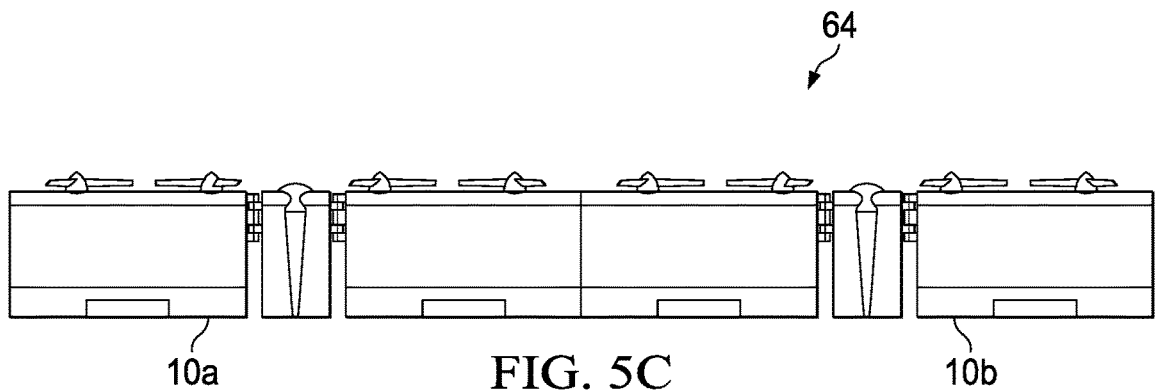
FIGS. 5A-5C are schematic illustrations of an aircraft having split wing and monoplane configurations in a detect and connect operating scenario in accordance with embodiments of the present disclosure.
Figure 5B:
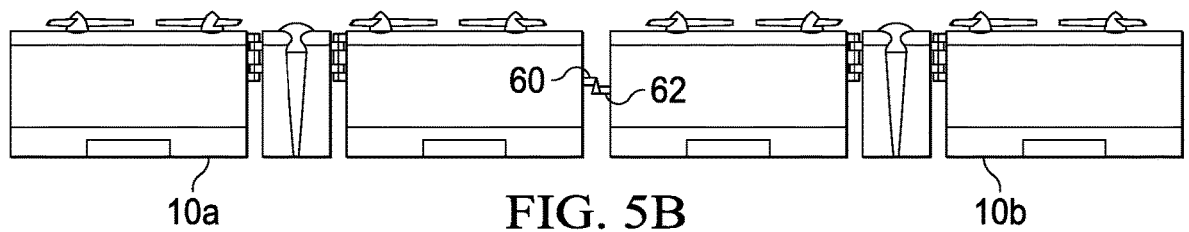
Figure 5A:
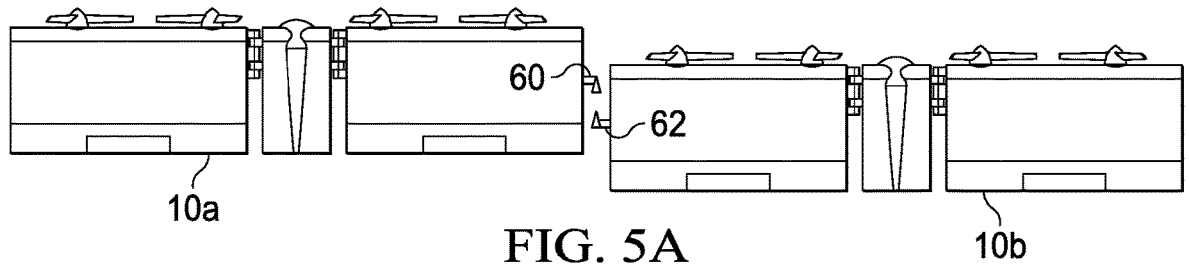

Once aircraft 10 has completed the transition to wing-borne forward flight mode, aircraft 10 may engage in high speed, high efficiency and/or high endurance forward flight. In one example, one or more of the propulsion assemblies of aircraft 10 may be operated in a low power mode or shut off entirely to maximize efficiency and/or match the thrust to drag. In another example, as best seen in FIGS. 5A-5C, multiple aircraft 10a, 10b may be coupled together wingtip-to-wingtip to improve propulsive and aerodynamic efficiency as well as to provide added mission functionality. In the illustrated embodiment, aircraft 10a, 10b are engaging in an air-to-air coupling procedure such as a detect and connect coupling procedure. In FIG. 5A, aircraft 10a has deployed a female wingtip coupling assembly depicted as receiver 60 and aircraft 10b has deployed a male wingtip coupling assembly depicted as lance 62. Responsive to autonomous flight control, remote flight control or a combination thereof, aircraft 10a, 10b engage in a docking maneuver to insert lance 62 within receiver 60, as best seen in FIG. 5B. Thereafter, aircraft 10a and/or aircraft 10b may retract receiver 60 and lance 62 to bring aircraft 10a, 10b into wingtip-to-wingtip coupling, as best seen in FIG. 5C. One or more additional securing or locking devices (not pictured) may be used to further secure aircraft 10a, 10b together for tandem flight of the multi-aircraft system 64. This procedure can be repeated with additional aircraft 10 to form larger multi-aircraft systems including three, four or other suitable number of aircraft.

After forming the desired multi-aircraft system, one or more of the propulsion assemblies of one or both of aircraft 10a, 10b may be operated in a low power mode or shut off entirely to reduce power consumption and extend the range of multi-aircraft system 54. In addition, aircraft 10a, 10b may share power, communications, fuel or other resources via suitable interfaces between aircraft 10a, 10b. In one example, the wingtips of aircraft 10a, 10b may have contact pads operable to transmit electrical power between aircraft 10a, 10b. As another example, data may be sent via a wired or wireless interface between aircraft 10a, 10b. When it is desired to reengage individual flight, aircraft 10a deploys receiver 60 and aircraft 10b deploys lance 62, as best seen in FIG. 5B. Responsive to autonomous flight control, remote flight control or a combination thereof, aircraft 10a, 10b engage in a separation maneuver to detach lance 62 from receiver 60, as best seen in FIG. 5A. Thereafter, aircraft 10a, 10b are operable for independent flight.

Figure 4F:
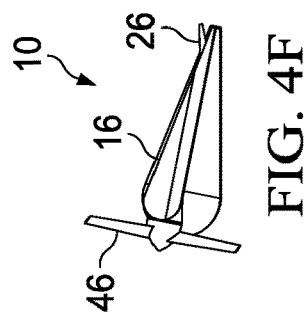
Figure 4G:
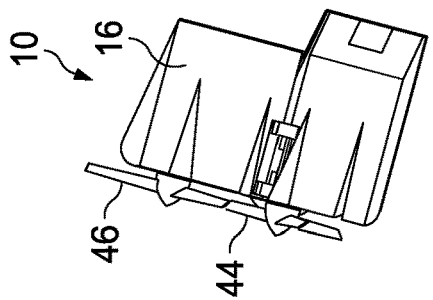
Figure 4H:
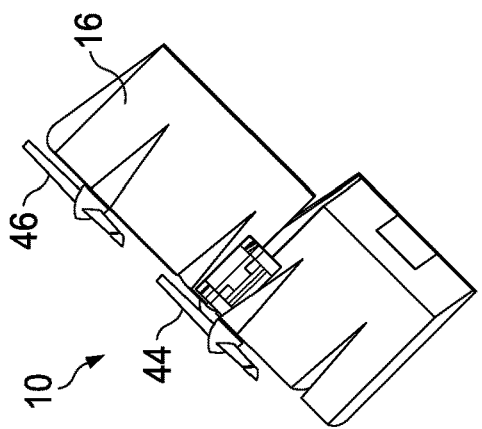
Figure 4I:
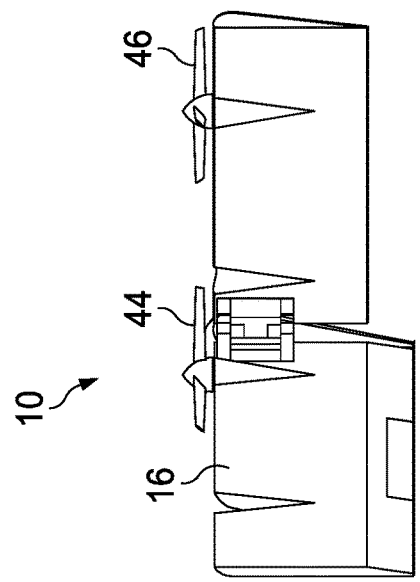
Figure 4J:
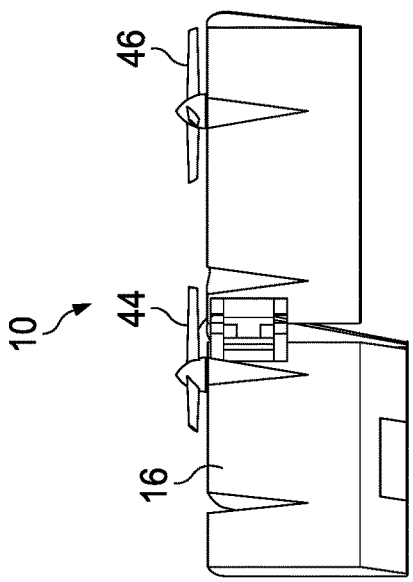

Returning to FIGS. 4A-4J, when aircraft 10 is approaching the destination, aircraft 10 may begin the transition from wing-borne forward flight mode to thrust-borne vertical lift mode, as best seen in the progression of FIGS. 4F-4I. In the illustrated embodiment, with aircraft 10 at a desired altitude and a desired speed, aerosurfaces 26 may be operated as elevators to increase the angle of attack of wing 16, as best seen in FIG. 4F. Aircraft 10 may then begin to pitch up by, for example, beginning to separate the wing layers of wing 16 and engaging in differential thrust output of propulsion assemblies 44 relative to propulsion assemblies 46, as best seen in FIGS. 4G and 1I. The process of pitching up and separating the wing layers continues, as best seen in FIGS. 4H and 1H. The transition is complete when the wing layers are fully separated, as best seen in FIG. 1G, and aircraft 10 has pitched up such that the rotor blades of propulsion assemblies 44, 46 are rotating in a substantially horizontal plane, as best seen in FIG. 4I. In other embodiments, the processes of pitching aircraft 10 up and separating the wing layers may occur independent of each other with the pitching up taking place before the wing layer separation or the wing layer separation taking place before the pitching up. Once aircraft 10 has completed the transition to thrust-borne vertical lift mode, aircraft 10 may commence its vertical descent to a landing surface at the destination location. As best seen in FIG. 4J, aircraft 10 has landed and is resting on the surface.

Figure 6:
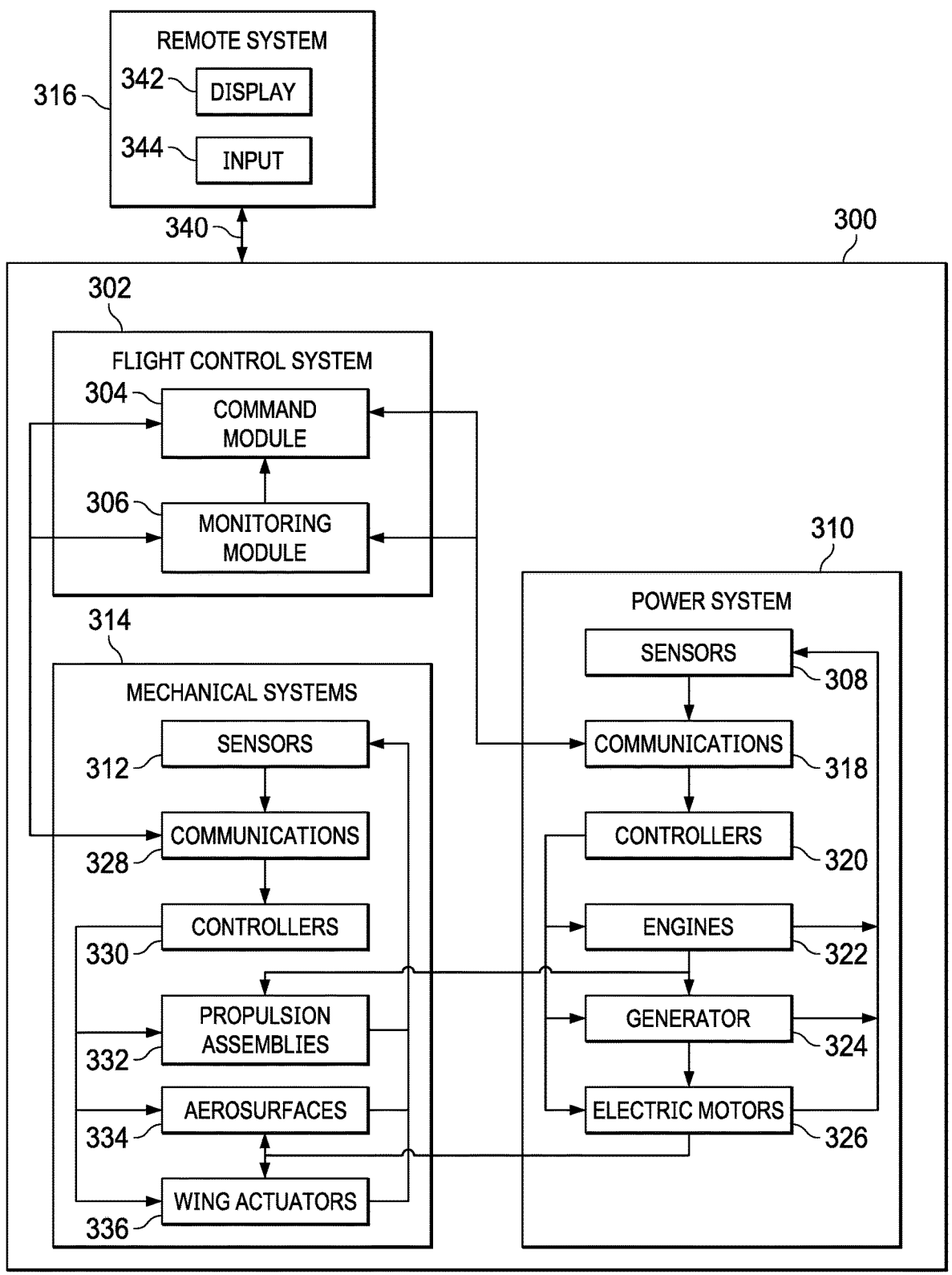
FIG. 6 is a systems diagram of an aircraft having split wing and monoplane configurations in accordance with embodiments of the present disclosure.

Referring to FIG. 6 in the drawings, a systems diagram of an aircraft having split wing and monoplane configurations is generally designated 300. As discussed herein, the aircraft of the present disclosure may be operated autonomously responsive to commands generated by a flight control system 302. In the illustrated embodiment, flight control system 302 includes a command module 304 and a monitoring module 306. It is to be understood by those having ordinary skill in the art that these and other modules executed by flight control system 302 may be implemented in a variety of forms including hardware, software, firmware, special purpose processors and combinations thereof. Flight control system 302 receives input from a variety of sources including sensors 308 of power system 310 and sensors 312 of mechanical system 314. Flight control system 302 may also receive input from external sources such as remote system 316, global positioning systems and the like. In the illustrated embodiment, power system 310 includes sensors 308, communications 318, controllers 320, engines 322, generator 324, electric motors 326 and other components required for power generation that are known to those skilled in the art. In addition, mechanical system 314 include sensors 312, communications 328, controllers 330, propulsion assemblies 332, aerosurfaces 334, wing actuators 336 and other components required for operating an aircraft that are known to those skilled in the art.

In one operational example, flight control system 302 may receive a mission from an external source, such as a command and control station, to deliver a payload to a desired location. Once the payload is secured to aircraft 300, flight control system 302 may autonomously control all aspects of flight of aircraft 300. During the various operating modes of aircraft 300 including the thrust-borne vertical lift mode, the wing-borne forward flight mode and transitions therebetween, to name a few, command module 304 provides commands to controllers 318 of power system 310 and controllers 330 of mechanical systems 314 to establish the desired operating parameters for each propulsion assembly, as discussed herein. For example, these commands may include rotor speed, rotor blade pitch, wing configuration, aerosurface position and the like. Flight control system 302 receives feedback from sensors 308 of power system 310 and sensors 312 of mechanical system 314. This feedback is processes by monitoring module 306, which supplies correction data and other information to command module 304. Monitoring module 306 preferably receives and processes information from additional aircraft sensors (not shown), such as positioning sensors, attitude sensors, speed sensors, environmental sensors, fuel sensors, temperature sensors, location sensors and the like. Monitoring module 306 provides the processed information to command module 304 to further enhance autonomous flight control capabilities.

Some or all of the autonomous control capability of flight control system 302 may be augmented or supplanted by remote flight control system 316. Remote system 316 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 316 communicates with flight control system 302 via a communication link 340 that may include both wired and wireless connections.

Remote system 316 preferably includes one or more display devices 342 configured to display information relating to one or more aircraft of the present disclosure. Display devices 342 may be configured in any suitable form, including, for example, liquid crystal displays, light emitting diode displays, cathode ray tube displays or any suitable type of display. Remote system 316 may also include audio output and input devices such as a microphone, speakers and/or an audio port allowing an operator to communicate with, for example, an operator of another remote system of the present disclosure. The display device 342 may also serve as an input device 344 if a touch screen display implementation is used, however, other input devices, such as a keyboard or joysticks, may alternatively be used to allow an operator to provide control commands to an aircraft being operated responsive to remote control.

Figure 7A:
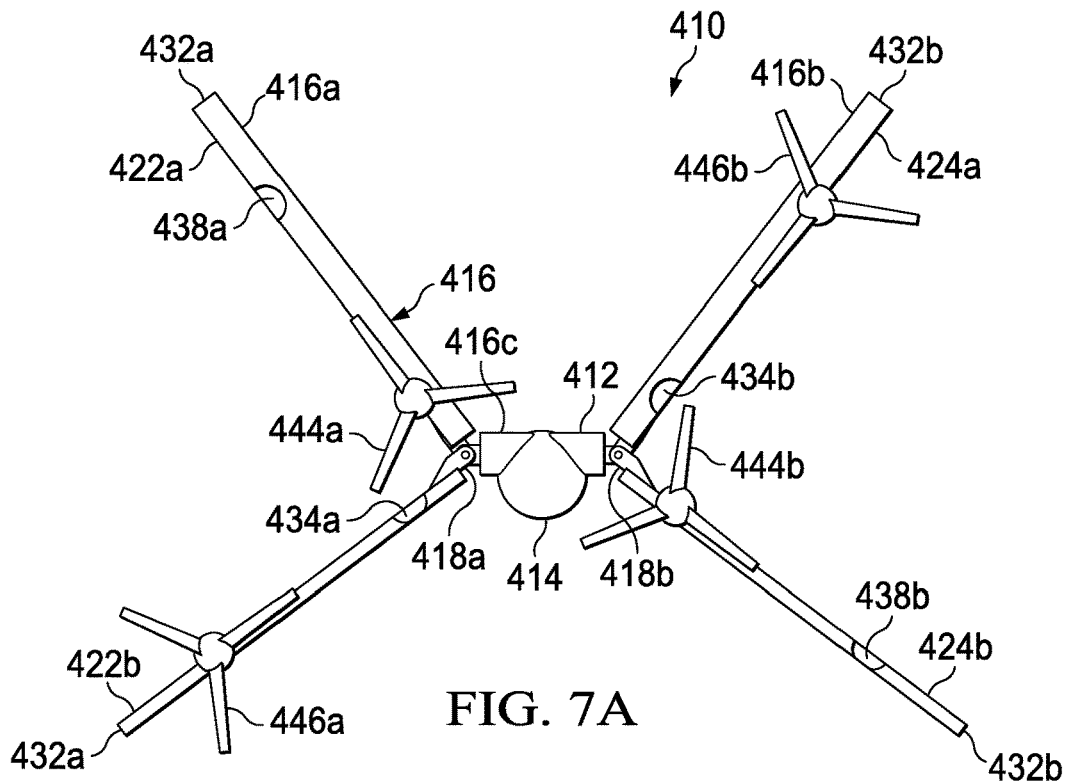
FIGS. 7A-7B are schematic illustrations of an aircraft having split wing and monoplane configurations in accordance with embodiments of the present disclosure.
Figure 7B:
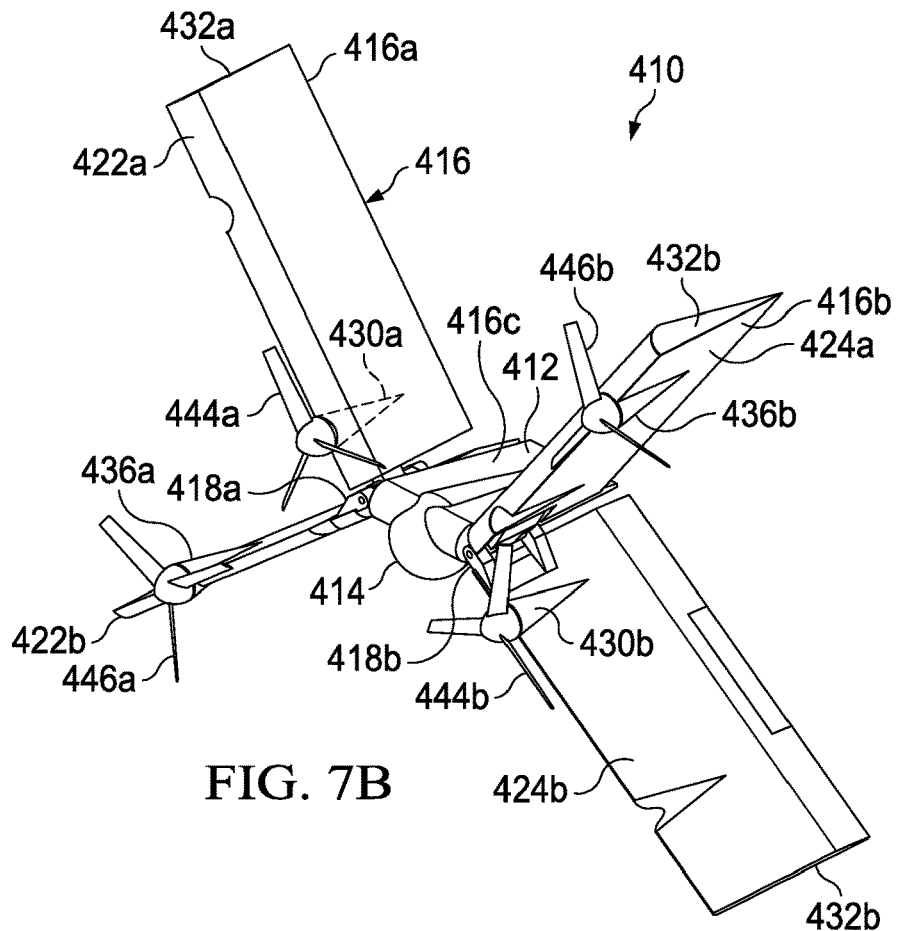

Even though the aircraft of the present disclosure have been depicted and described as having a thrust array with a particular symmetric arrangement in the split wing configuration, it should be understood by those having ordinary skill in the art that aircraft of the present disclosure could have thrust arrays with other arrangements including thrust arrays having asymmetric arrangements in the split wing configuration. For example, referring to FIGS. 7A-7B in the drawings, various views of an aircraft 410 having a thrust-borne vertical lift mode in a split wing configuration and a wing-borne forward flight mode in a monoplane configuration are depicted. In the illustrated embodiment, aircraft 410 has an airframe 412 including a fuselage 414 and a wing 416. Wing 416 has two outboard sections 416a, 416b with a root section 416c positioned therebetween. Outboard section 416a is coupled to an outboard end of root section 416c at a hinge assembly 418a having an actuator operable to separate and join wing layer 422a and wing layer 422b of outboard section 416a. Outboard section 416b is coupled to an outboard end of root section 416c at a hinge assembly 418b having an actuator operable to separate and join wing layer 424a and wing layer 424b of outboard section 416b.

In the illustrated embodiment, airframe 412 includes an inboard nacelle 430a that is positioned mid span of wing layer 422a of outboard section 416a, at any suitable location between the hinge assembly 418a and wingtip 432a. When aircraft 410 is in wing-borne forward flight mode, inboard nacelle 430a is received within nesting slot 434a of wing layer 422b. Airframe 412 also includes an inboard nacelle 430b that is positioned mid span of wing layer 424b of outboard section 416b, at any suitable location between the hinge assembly 418b and wingtip 432b. When aircraft 410 is in wing-borne forward flight mode, inboard nacelle 430b is received within nesting slot 434b of wing layer 424a.

In the illustrated embodiment, airframe 412 includes an outboard nacelle 436a that is positioned mid span of wing layer 422b of outboard section 416a, at any suitable location between the hinge assembly 418a and wingtip 432a. When aircraft 410 is in wing-borne forward flight mode, outboard nacelle 436a is received within nesting slot 438a of wing layer 422a that is outboard of inboard nacelle 430a. Airframe 412 also includes an outboard nacelle 436b that is positioned mid span of wing layer 424a of outboard section 416b, at any suitable location between the hinge assembly 418b and wingtip 432b. When aircraft 410 is in wing-borne forward flight mode, outboard nacelle 436b is received within nesting slot 438b of wing layer 424b that is outboard of inboard nacelle 430b.

In the illustrated embodiment, aircraft 410 has a distributed thrust array that includes four propulsion assemblies that are independently operated and controlled by a flight control system. More specifically, inboard propulsion assembly 444a extends from inboard nacelle 430a, inboard propulsion assembly 444b extends from inboard nacelle 430b, outboard propulsion assembly 446a extends from outboard nacelle 436a and outboard propulsion assembly 446b extends from outboard nacelle 436b. In the illustrated embodiment, the four independently operating propulsion assemblies 444a, 444b, 446a, 446b form an asymmetric two-dimensional thrust array in the thrust-borne vertical lift mode of aircraft 410, wherein propulsion assemblies 444a, 444b, 446a, 446b rotate in a common horizontal plane but do not occupy a common vertical plane. In this split wing configuration, the center of gravity of aircraft 410 is substantially centered between propulsion assemblies 444a, 444b, 446a, 446b which aids in stability of aircraft 10 during VTOL operations. In the illustrated embodiment, the four independently operating propulsion assemblies 444a, 444b, 446a, 446b form a one-dimensional thrust array in the wing-borne forward flight mode of aircraft 410, wherein propulsion assemblies 444a, 444b, 446a, 446b rotate in a common vertical plane and also share a common horizontal plane. In this monoplane configuration, the center of gravity of aircraft 410 is located below wing 416, which aids in stability of aircraft 410 during forward flight operations.

Figure 8:
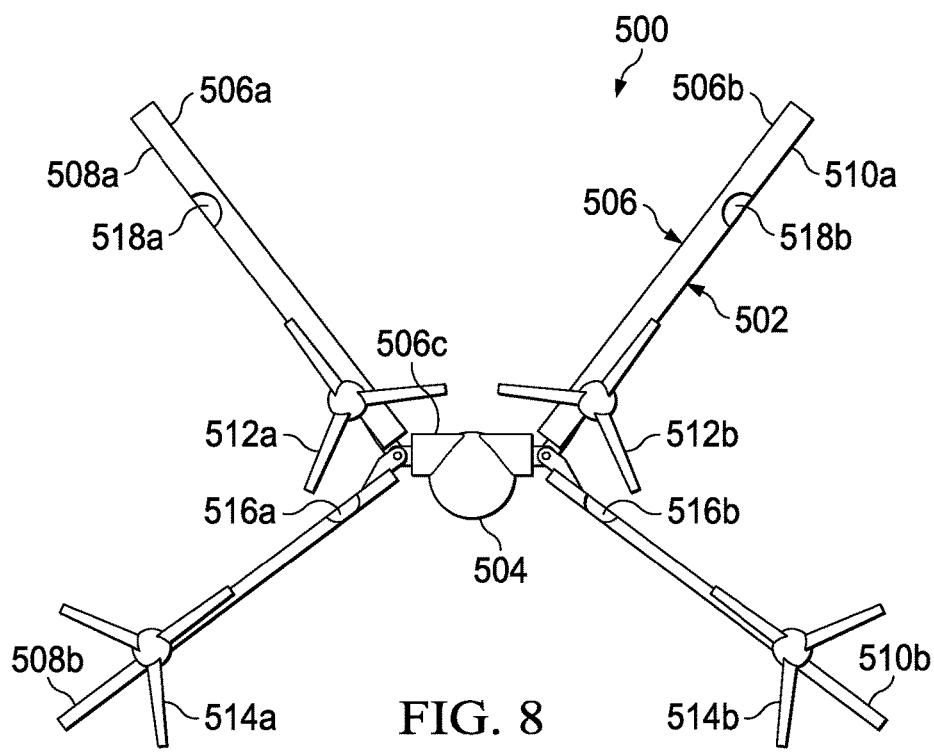
FIG. 8 is schematic illustration of an aircraft having split wing and monoplane configurations in accordance with embodiments of the present disclosure.

FIG. 8 depicts another embodiment of an aircraft having a thrust-borne vertical lift mode in a split wing configuration and a wing-borne forward flight mode in a monoplane configuration that is generally designated 500. In the illustrated embodiment, aircraft 500 has an airframe 502 including a fuselage 504 and a wing 506. Wing 506 has two outboard sections 506a, 506b with a root section 506c positioned therebetween. Outboard section 506a is coupled to an outboard end of root section 506c at a hinge assembly having an actuator operable to separate and join wing layer 508a and wing layer 508b of outboard section 506a. Outboard section 506b is coupled to an outboard end of root section 506c at a hinge assembly having an actuator operable to separate and join wing layer 510a and wing layer 510b of outboard section 506b.

In the illustrated embodiment, aircraft 500 has a distributed thrust array that includes four propulsion assemblies that are independently operated and controlled by a flight control system. More specifically, inboard propulsion assembly 512a extends from an inboard nacelle positioned mid span of wing layer 508a that is received within nesting slot 516a of wing layer 508b when aircraft 500 is in wing-borne forward flight mode. Inboard propulsion assembly 512b extends from an inboard nacelle positioned mid span of wing layer 510a that is received within nesting slot 516b of wing layer 510b when aircraft 500 is in wing-borne forward flight mode. Outboard propulsion assembly 514a extends from an outboard nacelle positioned mid span of wing layer 508b that is received within nesting slot 518a of wing layer 508a when aircraft 500 is in wing-borne forward flight mode. Outboard propulsion assembly 514b extends from an outboard nacelle positioned mid span of wing layer 510b that is received within nesting slot 518b of wing layer 510a when aircraft 500 is in wing-borne forward flight mode.

In the illustrated embodiment, the four independently operating propulsion assemblies 512a, 512b, 514a, 514b form a two-dimensional thrust array in the thrust-borne vertical lift mode of aircraft 500, wherein propulsion assemblies 512a, 512b, 514a, 514b rotate in a common horizontal plane but do not occupy a common vertical plane. In this split wing configuration, the center of gravity of aircraft 500 is substantially centered between propulsion assemblies 512a, 512b, 514a, 514b which aids in stability of aircraft 500 during VTOL operations. Also, in the illustrated embodiment, the four independently operating propulsion assemblies 512a, 512b, 514a, 514b form a one-dimensional thrust array in the wing-borne forward flight mode of aircraft 500, wherein propulsion assemblies 512a, 512b, 514a, 514b rotate in a common vertical plane and also share a common horizontal plane. In this monoplane configuration, the center of gravity of aircraft 500 is located below wing 506, which aids in stability of aircraft 500 during forward flight operations.

Figure 9:
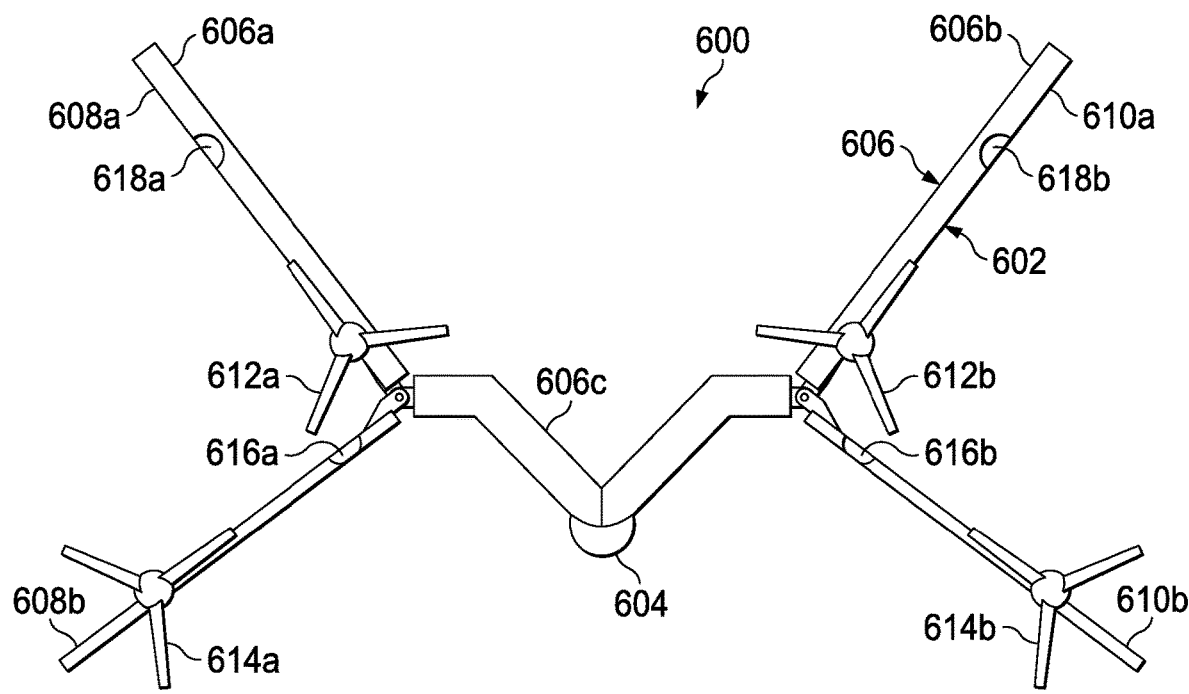
FIG. 9 is schematic illustration of an aircraft having split wing and monoplane configurations in accordance with embodiments of the present disclosure.

FIG. 9 depicts another embodiment of an aircraft having a thrust-borne vertical lift mode in a split wing configuration and a wing-borne forward flight mode in a monoplane configuration that is generally designated 600. In the illustrated embodiment, aircraft 600 has an airframe 602 including a fuselage 604 and a wing 606. Wing 606 has two outboard sections 606a, 606b with a root section 606c positioned therebetween. Outboard section 606a is coupled to an outboard end of root section 606c at a hinge assembly having an actuator operable to separate and join wing layer 608a and wing layer 608b of outboard section 606a. Outboard section 606b is coupled to an outboard end of root section 606c at a hinge assembly having an actuator operable to separate and join wing layer 610a and wing layer 610b of outboard section 606b. In the illustrated embodiment, root section 606c is a dihedral root section that has a generally V-shaped cross section such that in the monoplane configuration, aircraft 600 has a gull wing configuration. The V-shape root section 606c adds aerodynamic surface to improve yaw stability in the monoplane configuration of aircraft 600.

Aircraft 600 has a distributed thrust array that includes four propulsion assemblies that are independently operated and controlled by a flight control system. More specifically, inboard propulsion assembly 612a extends from an inboard nacelle positioned mid span of wing layer 608a that is received within nesting slot 616a of wing layer 608b when aircraft 600 is in wing-borne forward flight mode. Inboard propulsion assembly 612b extends from an inboard nacelle positioned mid span of wing layer 610a that is received within nesting slot 616b of wing layer 610b when aircraft 600 is in wing-borne forward flight mode. Outboard propulsion assembly 614a extends from an outboard nacelle positioned mid span of wing layer 608b that is received within nesting slot 618a of wing layer 608a when aircraft 600 is in wing-borne forward flight mode. Outboard propulsion assembly 614b extends from an outboard nacelle positioned mid span of wing layer 610b that is received within nesting slot 618b of wing layer 610a when aircraft 600 is in wing-borne forward flight mode.

In the illustrated embodiment, the four independently operating propulsion assemblies 612a, 612b, 614a, 614b form a two-dimensional thrust array in the thrust-borne vertical lift mode of aircraft 600, wherein propulsion assemblies 612a, 612b, 614a, 614b rotate in a common horizontal plane but do not occupy a common vertical plane. In this split wing configuration, the center of gravity of aircraft 600 is substantially centered between propulsion assemblies 612a, 612b, 614a, 614b which aids in stability of aircraft 600 during VTOL operations. Also, in the illustrated embodiment, the four independently operating propulsion assemblies 612a, 612b, 614a, 614b form a one-dimensional thrust array in the wing-borne forward flight mode of aircraft 600, wherein propulsion assemblies 612a, 612b, 614a, 614b rotate in a common vertical plane and also share a common horizontal plane. In this monoplane configuration, the center of gravity of aircraft 600 is located below wing 606, which aids in stability of aircraft 600 during forward flight operations.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a thrust-borne vertical lift mode and a wing-borne forward flight mode, the aircraft comprising:
   a fuselage;
   a wing coupled to the fuselage, the wing having a root section with first and second outboard ends, a first outboard section having first and second wing layers pivotably coupled to the first outboard end of the root section and a second outboard section having first and second wing layers pivotably coupled to the second outboard end of the root section, the first wing layer of each outboard section including an inboard nacelle and an outboard nesting slot, the second wing layer of each outboard section including an outboard nacelle and an inboard nesting slot;

a thrust array coupled to the wing, the thrust array including an inboard propulsion assembly extending from each of the inboard nacelles and an outboard propulsion assembly extending from each of the outboard nacelles;

a power system operably associated with the thrust array and operable to provide power to each of the propulsion assemblies; and a flight control system operably associated with the thrust array and the wing, the flight control system operable to control thrust output from each of the propulsion assemblies and operable to control wing configuration;

wherein, in the thrust-borne vertical lift mode, the wing has a split wing configuration with the wing layers of the first and second outboard sections separated such that the thrust array forms a two dimensional thrust array; and wherein, in the wing-borne forward flight mode, the wing has a monoplane configuration with the first and second wing layers of the first outboard section forming upper and lower portions of the first outboard section of the wing and with the first and second wing layers of the second outboard section forming upper and lower portions of the second outboard section of the wing such that the thrust array forms a one dimensional thrust array with the inboard nacelles of the first wing layers respectively received within the inboard nesting slots of the second wing layers and the outboard nacelles of the second wing layers respectively received within the outboard nesting slots of the first wing layers.

2. The aircraft as recited in claim 1 wherein the thrust array further comprises at least four propulsion assemblies.

3. The aircraft as recited in claim 1 wherein, in the split wing configuration, the two dimensional thrust array further comprises a symmetric thrust array.

4. The aircraft as recited in claim 1 wherein, in the split wing configuration, the two dimensional thrust array further comprises an asymmetric thrust array.

5. The aircraft as recited in claim 1 wherein the propulsion assemblies further comprise variable pitch rotor blades operable to change thrust output responsive to changes in rotor blade pitch and changes in rotational speed.

6. The aircraft as recited in claim 1 wherein the propulsion assemblies further comprise fixed pitch rotor blades operable to change thrust output responsive to changes in rotational speed.

7. The aircraft as recited in claim 1 wherein the power system further comprises at least one internal combustion engine and a drive system coupling the at least one internal combustion engine with the plurality of propulsion assemblies.

8. The aircraft as recited in claim 1 wherein the power system further comprises at least one battery and a plurality of electric motors each of which is operably associated with at least one of the propulsion assemblies.

9. The aircraft as recited in claim 1 wherein the power system further comprises a hybrid power system including at least one internal combustion engine, at least one alternator driven by the at least one internal combustion engine and at least one battery charged by the at least one alternator.

10. The aircraft as recited in claim 1 wherein, in the thrust-borne vertical lift mode, the flight control system is operable to control pitch, roll and yaw responsive to differential thrust output from the propulsion assemblies of the thrust array.

11. The aircraft as recited in claim 1 wherein, in the wing-borne forward flight mode, the flight control system is operable to control yaw responsive to differential thrust output from the propulsion assemblies of the thrust array.

12. The aircraft as recited in claim 1 wherein the first outboard section of the wing further comprises a first aerosurface, wherein the second outboard section of the wing further comprises a second aerosurface and wherein, in the wing-borne forward flight mode, the flight control system is operable to control pitch and roll responsive to operation of the first and second aerosurfaces.

13. The aircraft as recited in claim 1 wherein, in the split wing configuration, minor angles between the first wing layers of the first and second outboard sections and the root section are less than minor angles between the second wing layers of the first and second outboard sections and the root section.

14. The aircraft as recited in claim 1 wherein, during transitions between the thrust-borne vertical lift mode and the wing-borne forward flight mode, the wing transitions between the split wing configuration and the monoplane configuration.

15. The aircraft as recited in claim 1 wherein, prior to transitions from the wing-borne forward flight mode to the thrust-borne vertical lift mode, the wing transitions from the monoplane configuration to the split wing configuration.

16. The aircraft as recited in claim 1 wherein the root section of the wing further comprises a dihedral root section.

17. The aircraft as recited in claim 1 wherein the flight control system further comprises a remote controlled flight control system.

18. The aircraft as recited in claim 1 wherein the flight control system further comprises an autonomous flight control system.

19. A multi-aircraft system including at least first and second aircraft connectable wingtip-to-wingtip during flight, each aircraft having a thrust-borne vertical lift mode and a wing-borne forward flight mode and each aircraft comprising:

a fuselage;

a wing coupled to the fuselage, the wing having a root section with first and second outboard ends, a first outboard section having first and second wing layers pivotably coupled to the first outboard end of the root section and a second outboard section having first and second wing layers pivotably coupled to the second outboard end of the root section, the first wing layer of each outboard section including an inboard nacelle and an outboard nesting slot, the second wing layer of each outboard section including an outboard nacelle and an inboard nesting slot;

a thrust array coupled to the wing, the thrust array including an inboard propulsion assembly extending from each of the inboard nacelles and an outboard propulsion assembly extending from each of the outboard nacelles;

a power system operably associated with the thrust array and operable to provide power to each of the propulsion assemblies;

a female wingtip coupling assembly at the outboard end of the first outboard section;

a male wingtip coupling assembly at the outboard end of the second outboard section; and a flight control system operably associated with the thrust array, the wing and the wingtip coupling assemblies, the flight control system operable to control thrust output from each of the propulsion assemblies, wing configuration and wingtip coupling;

wherein, in the thrust-borne vertical lift mode, the wing has a split wing configuration with the wing layers of the first and second outboard sections separated such that the thrust array forms a two dimensional thrust array;

wherein, in the wing-borne forward flight mode, the wing has a monoplane configuration with the first and second wing layers of the first outboard section forming upper and lower portions of the first outboard section of the wing and with the first and second wing layers of the second outboard section forming upper and lower portions of the second outboard section of the wing such that the thrust array forms a one dimensional thrust array with the inboard nacelles of the first wing layers respectively received within the inboard nesting slots of the second wing layers and the outboard nacelles of the second wing layers respectively received within the outboard nesting slots of the first wing layers; and wherein, in a connected flight mode, the female wingtip coupling assembly of the first aircraft is coupled to the male wingtip coupling assembly of the second aircraft.

* * * * *